United States Patent

[11] 3,539,149

| [72] | Inventor | Bernard S. Se Breny |
| | | Oak Brook, Illinois |
| [21] | Appl. No. | 746,156 |
| [22] | Filed | July 19, 1968 |
| [45] | Patented | Nov. 10, 1970 |
| [73] | Assignee | Aladdin Rubber Corporation |
| | | Oak Brook, Illinois |
| | | a corporation of Illinois |

[54] GATE FOR ABOVEGROUND IRRIGATION PIPE
4 Claims, 12 Drawing Figs.

[52] U.S. Cl. ..................... 251/145, 251/193
[51] Int. Cl. ..................... F16k 3/22
[50] Field of Search ........... 251/145, 193

[56] References Cited
UNITED STATES PATENTS

| 2,734,713 | 2/1956 | Webster | 251/145 |
| 3,327,990 | 6/1967 | Hohnstein | 251/145 |
| 3,455,533 | 7/1969 | Epp | 251/145 |

Primary Examiner—William R. Cline
Attorney—Darbo, Robertson and Vandenburgh

ABSTRACT: A gate for regulating flow of water out of the side wall of an aboveground irrigation pipe in which an inside element and an outside element slide in unison to expose or obstruct the opening in the pipe wall. The inside element is connected to the outside element only adjacent to the downstream end of the inside element by a rigid lever arm fixed to the inside element. Sliding forces exerted on the outside element to open the gate causes the inside element to pivot slightly away from the wall thereby greatly facilitating the sliding motion. This is due to lubrication by water and due to the forces of the water moving in the pipe. In a preferred embodiment the inside element has a specially adapted rubberlike boot in which continuously exerted internal stresses cause the down-stream end thereof to tend to press outwardly against the inside of the pipe to facilitate and maintain a seal at that otherwise relatively loose end of the gate.

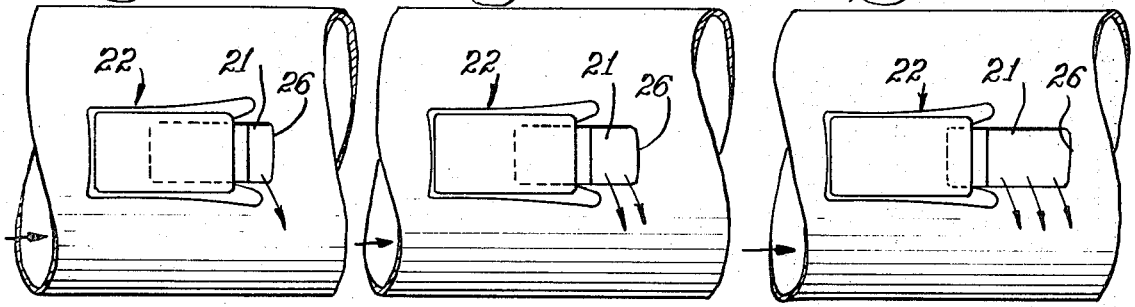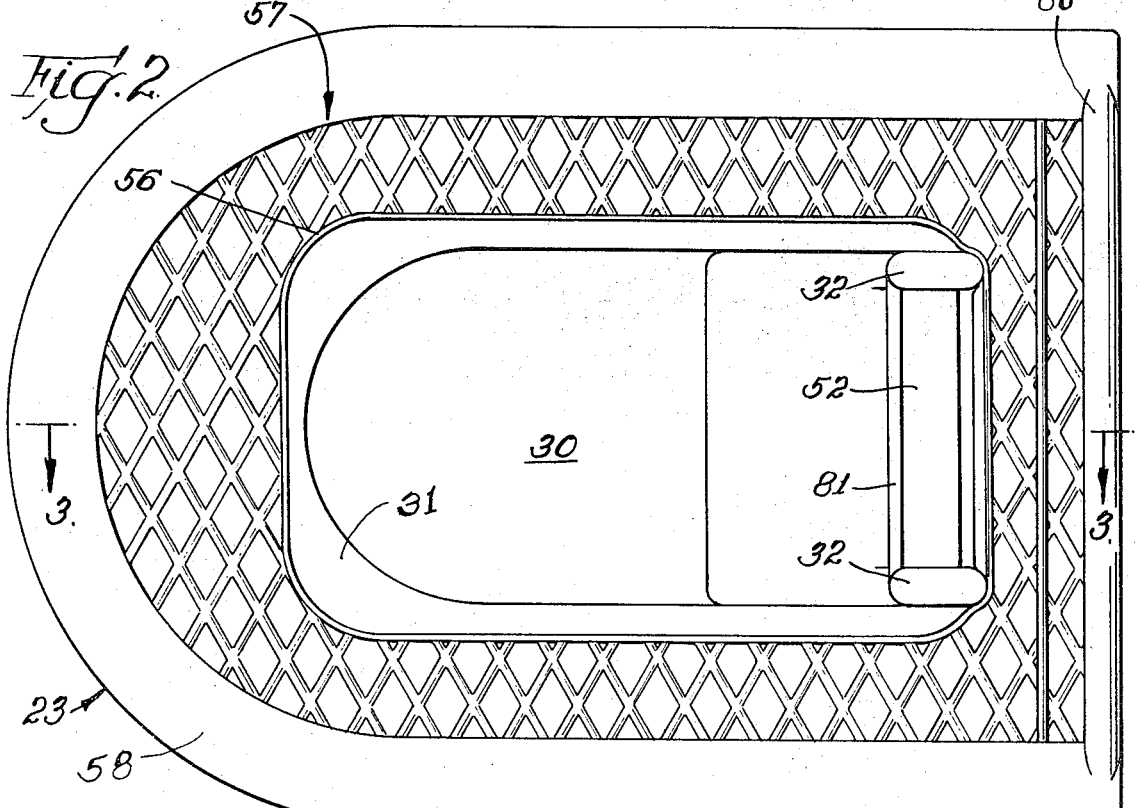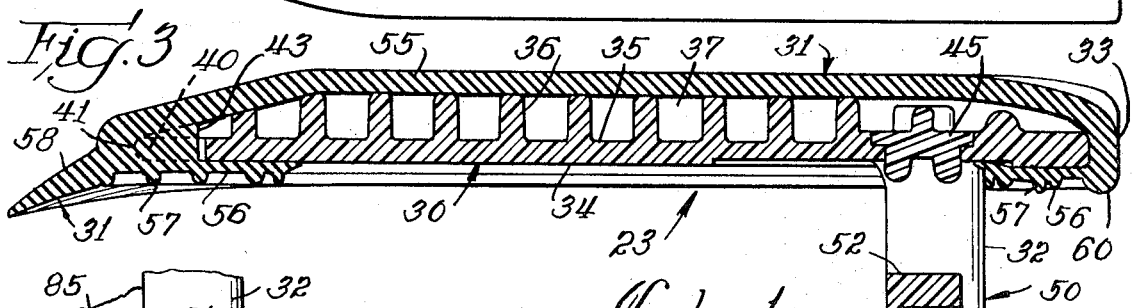

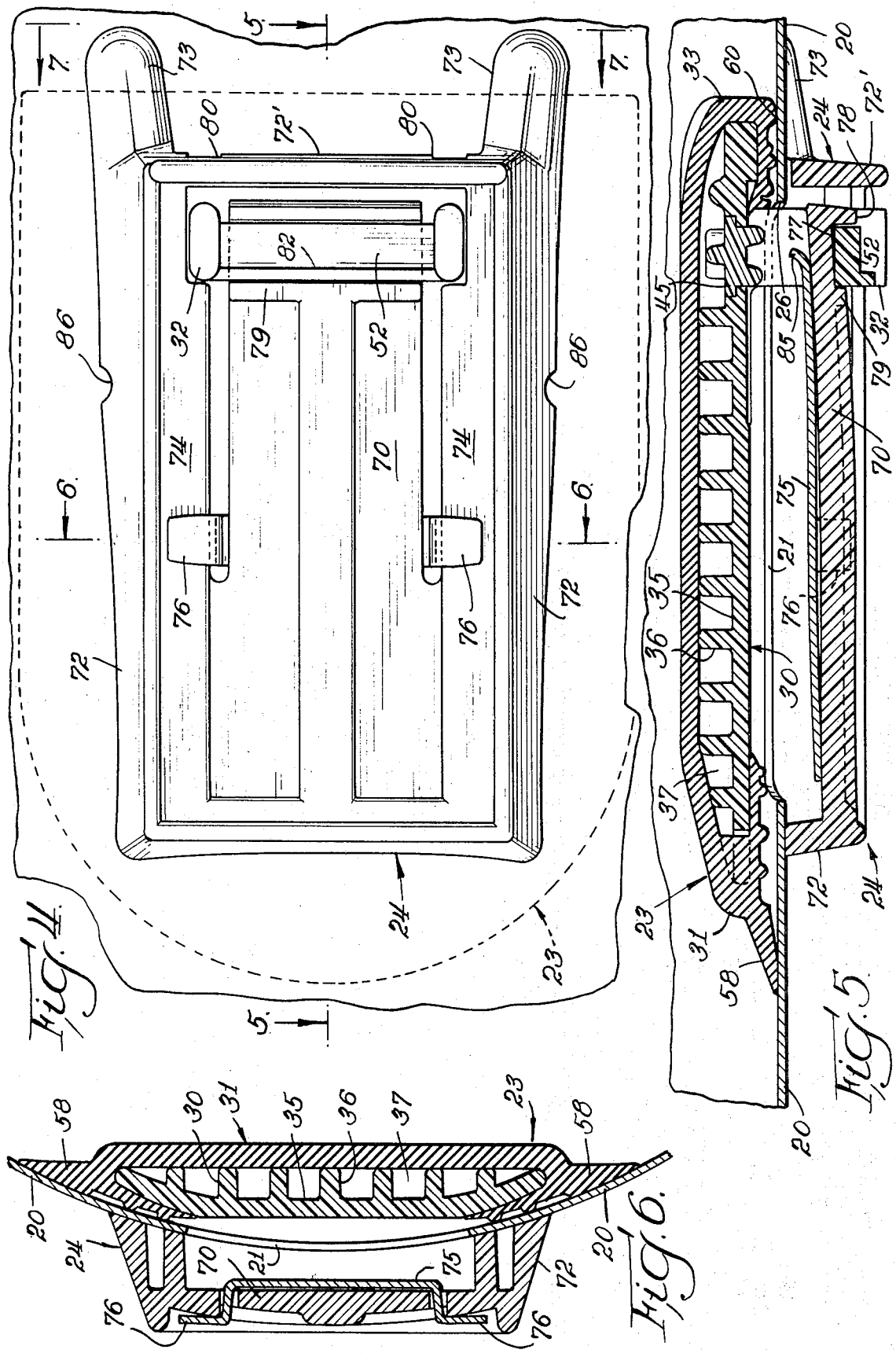

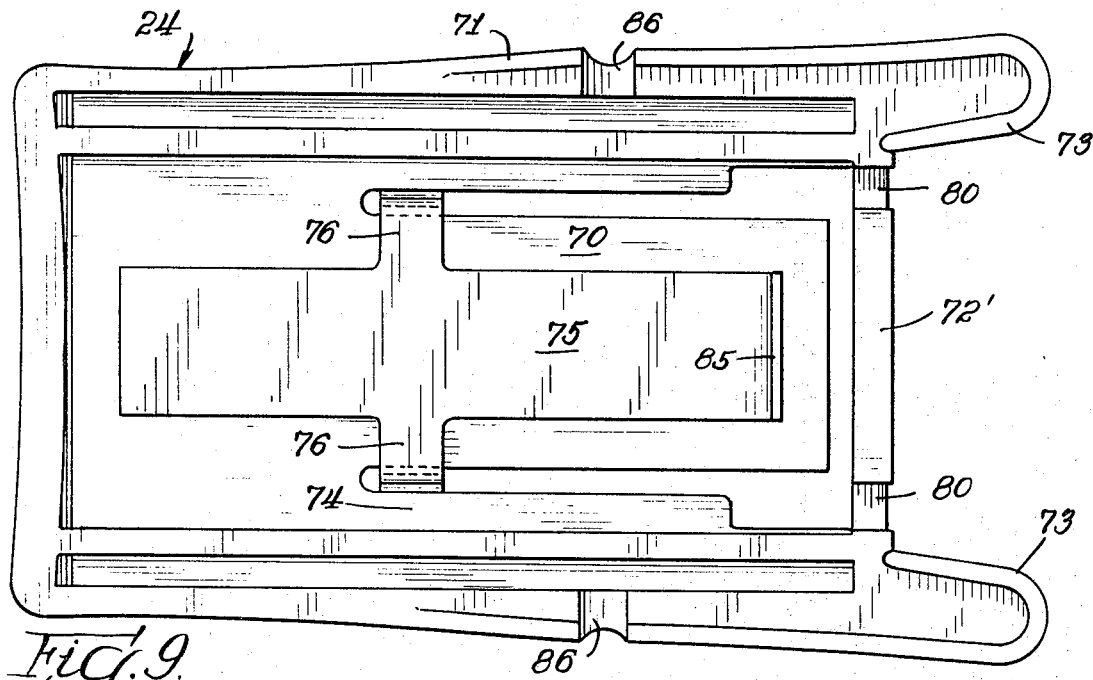
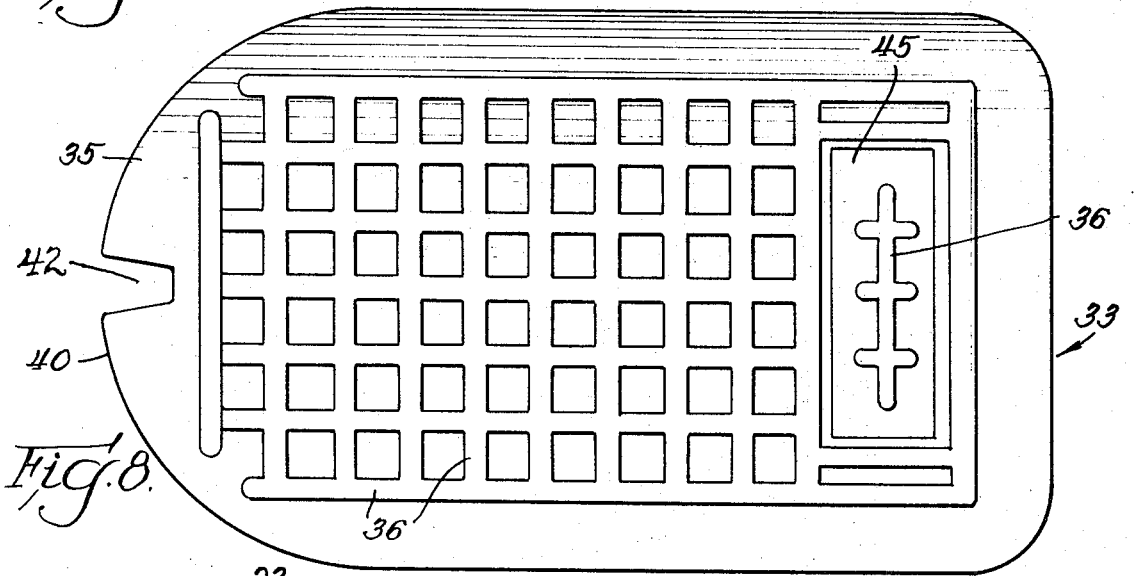
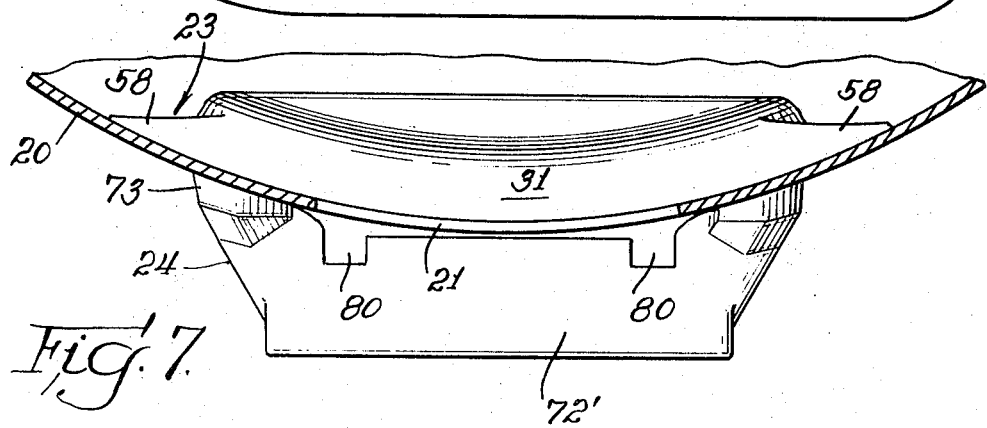

3,539,149

GATE FOR ABOVEGROUND IRRIGATION PIPE

BACKGROUND OF THE INVENTION

The use of thin walled aboveground aluminum pipe in agricultural irrigation is becoming a very widespread practice. These pipes are employed conventionally in relatively short lengths, e.g. 30 feet, and are connected end to end to provide long, relatively straight lines of water conveying pipes lying directly on the ground. It is common practice to provide a large number of relatively small openings in the wall of such pipe. These openings may be approximately 2¾ inches in length and 1¼ inches in width, the length of the opening being parallel with the length of the pipe. These openings are conventionally between 15 and 30 inches apart for the irrigation of row crops and may be many feet apart for irrigation of orchards. Thus, hundreds if not thousands of these openings are involved in the use of a long section of irrigation pipe. Thus, it is essential that the gates or valves used to control the flow of water through the side wall of the aboveground irrigation pipe be extremely simple in operation. It is most desirable that the gate be designed to permit the valve to be opened, closed or adjusted by a man walking along the run of pipe sliding a piece of 2 × 4 lumber along the side of the pipe bumping the consecutive valves with the 2 × 4. Also, in view of the fact that great economy in manufacture is essential, it is desirable that the gates be of a design which will permit a single valve to fit 6 inches, 8 inches, 10 inches or 12 inches diameter irrigation pipe. It is also desirable that the valve structures protrude as little as possible from the external surface of the pipe so that when the run of pipe is disconnected and the individual shorter lengths, e.g. 30 feet, are roughly loaded and stacked in a truck, the valves themselves will be subjected to a minimum of damage and will inflict a minimum of damage to adjacent pipes coming in contact therewith. Also, long runs of pipes have occasionally been damaged by collapsing when the pressure of the water inside the pipe becomes negative with respect to atmospheric pressure due to the absence of adequate venting when pumping is discontinued. Thus it is also most desirable that the closed gate structures themselves provide a dependable seal against the outflow of water and yet provide venting of air into the pipe when the internal pressure becomes below atmospheric pressure. It is the object of this invention to provide an economically produced gate valve of the type described above which has all of the desirable characteristics described above. It is the further object of this invention to provide a gate which can be readily installed and replaced and which provides dependable seal even after long life under abusive conditions.

SUMMARY OF THE INVENTION

In accordance with this invention, the gate includes an interior element and an exterior element which are attached to each other so that a sliding motion imparted to the exterior element is imparted to the interior element. The interior element includes a flexible, resilient bootlike member adapted to bear against the inner surface of the pipe wall around the entire opening of the pipe wall when the valve is in the closed position. In accordance with this invention, the inside element is attached to the outside element only near the downstream end of the inside element. The attachment means includes a rigid lever arm rigidly fixed to the inside element. The rigid arm extends through the opening of the pipe and is pivotally engaged at a point exterior to the pipe by engaging means which are resiliently attached to the outside element. I have found that subjecting the outside element to forces in an axial direction to cause the gate to slide open, first results in the downstream end of the inside element pivoting inwardly, thus providing a jawlike opening at its upstream end. This opening permits a high velocity water stream to bear against the gate between the sealing surface of the gate and the inner surface of the pipe. I have found that this factor, plus the wetting of the opposing gate-pipe surfaces, decreases the friction between the relatively flexible resilient sealing surface and the inner surface of the pipe, thus facilitating the sliding of the valve.

In a preferred embodiment of this invention, the inner element utilizes a flexible bootlike sealing member having a cavity therein for tightly fitting the boot on a shoe member. The boot is manufactured to provide a side-to-side curvature in the cavity at the downstream end which is of greater radius than the curvature of the inner shoelike member in that region. Hence, as a consequence of the different radii of the upstream end side-to-side curvature of the boot cavity and the upstream end side-to-side curvature of the shoe, the extreme front of the boot is subjected to more stretching than the more lateral portions of the curved end. Thus the bootlike element is subjected to continuous internal stress in which the extreme end of the sealing boot is continuously flexed in the direction of the adjacent wall of the pipe by tension in the adjacent regions of the bootlike element. Hence, when the boot is fitted on the shoelike element, its shape becomes substantially different than that of the boot at rest and substantially different than the shoe element enclosed therein.

In another preferred embodiment the external element includes means for urging the internal element against the inner wall of the pipe which includes a resilient plastic tongue pivotally engaging the underside of a crossbar which is fixed to substantially perpendicular rigid posts or lever arms rigidly extending from the shoe, the resilient plastic tongue being assisted by a flat metallic spring removably attached to the underside of the resilient plastic tongue.

DESIGNATION OF THE DRAWINGS

FIGS. 1A, 1B and 1C are fragmentary schematic lateral views of irrigation pipe having gates of this invention incorporated thereon.

FIG. 2 is a plan view of the internal element as viewed in FIG. 1 with the external element and the wall of the pipe removed.

FIG. 3 is a cross-sectional view taken approximately along the line 3–3 in FIG. 2.

FIG. 4 is an enlarged detailed view of the gate of this invention as viewed in FIG. 1.

FIG. 5 is a cross-sectional view taken approximately along the line 5–5 in FIG. 4.

FIG. 6 is a cross-sectional view taken approximately along the line 6–6 in FIG. 4.

FIG. 7 is an end view taken approximately along the line 7–7 in FIG. 4.

FIG. 8 is a view taken from the interior of the pipe, of the internal shoe element with the rubber boot removed therefrom.

FIG. 9 is a plan view of the cover element of this invention taken from the pipe-engaging side of the cover.

FIG. 10 is a fragmentary cross-sectional view showing the bridge portion of FIG. 3, with the removed cover in assembly position.

DESCRIPTION OF THE PREFERRED EMBODIMENT

Although the following disclosure offered for public dissemination in return for the grant of a patent is detailed to insure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

In accordance with a preferred embodiment of this invention, irrigation pipe 20 having an opening 21 in this side wall thereof, is fitted with a gate valve 22 to control the flow of water through opening 21. This is accomplished by sliding gate valve 22 to expose or obstruct more or less of the opening as illustrated by the various positions of the gate valve shown in FIGS. 1A, 1B, and 1C, in which the arrows indicate direction of flow of water. Hence edge 26 of opening 21 is the "downstream" edge.

In general terms, the gate valve in accordance with this invention has an internal element 23, and an external cover element 24. The terms internal and external are used with respect to the interior or exterior of irrigation pipe 20. The internal element is made up of a rigid shoe 30, preferably made of plastic, and a flexible elastic boot 31 snugly fitting on shoe 30. Shoe 30 is equipped with substantially vertical posts 32 rigidly affixed thereto and extending in a substantially perpendicular direction from surface 34 of shoe 30 which faces the interior wall of pipe 20. Posts 32 are attached to shoe 30 adjacent the downstream end 33 of the internal element 23. From side 35 of internal shoe 30 which faces the main interior region of pipe 20, a large number of ribs 36 extend perpendicularly. This causes air to be trapped in the space 37 between shoe 30 and boot 31. It is noted that the curvature, perhaps best seen in FIG. 6, of boot 30, does not exactly conform to the curvature of pipe 20. Pipe 20 is engaged by the elastic resilient boot 31. While the downstream end 33 of shoe 30 is generally straight from side to side, the upstream end 40 is rounded. In accordance with the preferred embodiment of this invention, the radius of the side-to-side curvature at upstream end 40 of shoe 30 is substantially smaller than the radius of curvature of the upstream end 41 of the relaxed boot cavity prior to insertion of shoe 30 therein. However, because boot 31 fits snugly around shoe 30, and since boot 31 is made from resilient, flexible rubberlike material, upstream end 41 of the boot cavity takes the shape of the front end 40 of the shoe. However, because of the relative position of the various elements of the boot and because of the differences of curvature hereinbefore described, the exterior appearance of the boot is changed as a result of the fitting of the boot on the shoe. This phenomenon will be discussed in greater detail hereinafter.

The upstream end 40 of shoe 30 is provided with a notch 42 which engages a heavy web 43 extending into the cavity of boot 31. The shoe illustrated also contains a closet element 45 which merely fills the space left open in the shoe by the molding of the superstructure consisting of posts 32 and cross bar 52.

Boot 31 includes a wall 55 which faces the main portion of the interior of the pipe and a second wall 56 which faces the interior surface of pipe 20. Wall 56 has a large number of ribs 57 extending from the exterior thereof for engaging the inner surface of pipe 20. Also on the pipe engaging surface of boot 31 and completely surrounding the ribs 57, is a region 58 in which the flexible resilient boot is smooth-surfaced. This smooth surface is one side of a relatively thin, feathered fin which extends outwardly from the boot at both sides of the boot and the rounded upstream end of the boot. As perhaps seen in FIGS. 3 and 6, fin 58 does not extend from boot 31 in the same plane as shoe 30 in the upstream region of the internal element 23, but rather extends from a level somewhat between shoe 30 and irrigation pipe 20, i.e. approximately on the level as wall 56 of boot 31. Thus when boot 31 is pulled tightly over shoe 30, the downstream end 41 of boot 31 is stretched by the opposing downstream surface 40 of shoe 30 in the region of notch 42. The stretching of the boot which is required to provide a snug fit provides tension in wall 56 of the boot. This stretches the more lateral portion of the rounded downstream end of the boot until the front surface 41 in the boot cavity snugly fits against front surface 40 of the shoe. This stretching causes fin 58 to flex towards the direction of pipe 20. Thus the continuously exerted tension caused by the stretching of boot 31 over shoe 30 flexes fin 58 toward cover element 24 thus providing continuously exerted pressure at the downstream regions of fin 58 against the inner wall of pipe 20 when the gate is installed in pipe 20, and the gate is at rest.

A superstructure consisting of posts 32 and crossbar 52 is rigidly affixed to shoe 30 adjacent to downstream end 33 of shoe 30. The posts cannot be positioned immediately at the edge of shoe 30 because of the need for providing sufficient overlap of boot wall 56 to assure retention of the boot on shoe. However, in accordance with this invention, superstructure 50 is positioned as close to the downstream end of internal element 31 as possible consistent with reliable retention of the boot. Wall 56 of boot 31 terminates in the downstream extreme in a heavy, smooth, rounded ridge 60. As will be explained in greater detail hereafter, rounded ridge 60 provides the pivot point for the jawlike opening of internal element 23 when sliding pressure is brought to bear to open the gate.

Superstructure 50 and more particularly crossbar 52 engages tongue 70 of cover element 24.

EXTERNAL COVER ELEMENT

External cover element 24 has pipe engaging surface 71, top 74, side walls 72, tongue 70 and fingers 73. Tongue 70 is molded as an integral part of cover 24 in such a manner that it must be firmly depressed from its unstretched, relaxed condition to a configuration in which it will be able to engage crossbar 52. Thus the resilience of tongue 70 causes internal element 23 to be urged in the direction of pipe 20 and external element 24 when the elements are assembled as illustrated in the drawing. I prefer to use flat metallic spring 75 positioned between tongue 70 and pipe 20 as illustrated. Spring 75 has fingers 76 extending from the sides thereof and upwardly in the space between tongue 70 and top 74 of cover element 24. Since spring 75 is situated beneath tongue 70 and fingers 76 extend upwardly and engage the top of cover 74, thereby maintaining the flat spring in a position immediately adjacent to tongue 70, depression of tongue 70 also causes a flexing of spring 75. Hence, spring 75 provides additional force in urging internal element 23 in the direction of external element 24. Tongue 70 engages crossbar 52 pivotally at the extreme end of tongue 70 in notch 77 which is formed between ridges 78 and 79. Ridge 78 is substantially higher then ridge 79 to better insure continued engagement of crossbar 52 by tongue 70 even when superstructure 50 is pivoted in a relatively depressed condition with respect to tongue 70, i.e. when top cover is first pushed open. No pivoting occurs when the gate is pushed closed.

Cover element 24 is provided with notches 80 in the downstream end wall 72'. Crosspiece 52 is provided with a ridge 81 at its outermost upstream region. Notches 80 and ridge 81 facilitate the connecting of internal elements 23 and external elements 24. Notches 80 are positioned to engage top of the posts 32; and ridge 82 is positioned to engage the bottom of wall 72' during one stage of assembly. (See FIG. 10.)

Hence, when cover element 24 is to be connected to internal element 23 in assembly of the gate on the irrigation pipe, internal element 23 is first passed through opening 21 and is rotated so that the rounded end points in the upstream direction. At this point most of element 23 is within the pipe, i.e. except for superstructure 50 which passes through opening 21 to the exterior of pipe 20. Cover element 24 is then placed adjacent to the pipe with bearing surfaces 71 facing pipe 20, in such a position that the bottom of wall 72' rests upon the top of crosspiece 52 and the top of posts 32 are seated within notches 80. Tongue 70 is then depressed to a level which will permit sliding of cover element 24 so that the top of ridge 78 passes under crosspiece 52. Notches 80 and ridge 81 on crosspiece 52 helps stabilize the position of cover 24 while tongue 70 is being depressed. Also ridge 81 makes it virtually impossible to assemble the gate with the cover pointing in the less preferred direction, since the cover cannot slide off the crossbar in that direction. As cover element 24 slides during proper assembly to pass tongue 70 under crossbar 52, wall 72' clears the top of posts 32 and the tension exerted by tongue 70 and spring 75 causes the cover to snap in place in the position illustrated in FIG. 5.

OPERATION OF VALVE

FIG. 5 illustrates a cross-sectional view of a preferred valve gate of this invention in a closed position. When an operator strikes the downstream wall 72' of the cover, ridge 78 engages crossbar 52, thus urging the crossbar in the upstream direction. However, posts 32 act as a lever. Because of the friction between wall 56 and the internal surface of pipe 20, particularly in the region between downstream ridge 60 and the internal surface of the pipe, upstream motion of the internal element is resisted. Thus the sliding force exerted on cover 24 by the pushing of cover element 24 in the upstream direction results initially in a pivoting of posts 32 with respect to tongue 70. Hence, as forces are exerted at the top of the posts or lever arm 70, the upstream region of internal element 23 is caused to move away from pipe 20 as internal element 23 pivots around the point of contact between the internal surface of pipe 20 and ridge 60. Hence, it is essential in this invention that tongue 70 and spring 76 can move in the direction of the pipe without being hindered by obstructions, and without reaching the limit of the flexibility of tongue 70 and spring 76. As soon as internal element 23 moves away from the interior surface of pipe 20 at the downstream end, water within the pipe rushes into the area thus opened. Continued pressure of the cover causes sliding at the pivot point between ridge 60 and the interior wall of the pipe and, because of the presence of water at the interior surface of the wall of the pipe between wall 56 and the interior surface of the pipe, friction between boot 31 and the pipe is greatly reduced. Hence, the gate readily slides to the desired open position, as illustrated in FIGS. 1A, 1B and 1C.

The presence of air space 37 between shoe 30 and boot 31 provides a cushion to minimize water hammer in an extended section of pipe.

Insofar as posts 32 are situated adjacent to the downstream end of shoe 30, relatively great pressure is exerted between ridge 60 and the inner wall of pipe 20, while relatively little pressure is exerted between wall 56 and the interior surface of pipe 20 at the upstream end of the internal element 24. Thus, in accordance with this invention, most of the sealing action is provided by the effect of the internal pressure on the flexible feathered fin 58, causing the fin to be pressed against the internal wall of pipe 20. However, some additional pressure is achieved because of the internal stresses in boot 31 which are maintained while the flexible resilient boot is snugly fitted around shoe 30. Thus, in view of the relatively light pressure exerted at the upstream end of a gate having configuration in accordance with this invention, it is most advantageous to provide means in the internal element 23 for continuously pressing fin 58 in the rounded upstream area of the boot against the interior surface of irrigation pipe 20. Hence, in accordance with this invention, the seal in the upstream region is improved by the permanent internal stress present in the rubber boot when used in conjunction with a shoe having an upstream and radius of curvature substantially less then the radius of curvature in the upstream and the cavity of the boot.

As perhaps best appreciated from a consideration of FIGS. 6 and 7, one size gate having the preferred structure can fit many sizes of pipe. This is possible because it has a laterally extending fin 58 extending as above described from the sides and front of the internal element, and because of the thick, rounded, resilient ridge 60 which smoothly blends into the fin at region 61, and because the boot is flexible, and resilient. Hence, the externally generated pressure of the shoe and the internal pressure of the water and internal stresses within the boot all cooperate to force the flexible, resilient boot against the surface of the pipe in sealing engagement therewith.

However, if for any reason a sudden negative pressure should develop within the irrigation pipe at a time in which substantially all of the valves are closed, atmospheric pressure against exposed surface of shoe 30 is sufficient to cause the internal element 23 to pivot in jawlike fashion around the point of contact between ridge 60 and the interior surface of pipe 20, thus permitting atmospheric air to enter the pipe, preventing its collapse.

When the gate is removed from the pipe, the rubber boot element can be readily replaced, and spring 75 can be readily slipped out from under tongue 70 by elevating tongue 70 above end wall 72' and sliding the spring in the direction of wall 72'. Because of the flex of tongue 70 during the operation of the gate of this invention, it is preferred that spring 75 be provided with beveled end 85 to prevent spring 75 from digging into tongue 70 during repeated flexing of tongue 70.

In the use of a gate valve of this invention, an operator can simply walk along an extended run of irrigation pipe lying on the ground and strike the gate valve at one end or the other with a stick to open or close the valve.

The heavy rounded ridge 60 at the downstream end of the boot also facilitates passage of the boot under downstream edge 26 of the opening 21 in pipe 20 during closing of the gate. An additional advantage of situating the post 32 adjacent the downstream end of shoe 30 is the fact that a maximum exposure of pipe opening 21 is achieved when the valve is in the open position.

I prefer the utilization of fingers 73 at the downstream end of cover element 24. Unless these fingers or their equivalent are present to provide a relatively long radius of pivot when the cover is lifted at its upstream end, it is undesirably easy to separate tongue 70 from its engagement with crossbar 52. Indentations 86 in the pipe contacting surface of cover 24 are provided for attachment of accessory equipment such as deflectors which can be used to divide the effluent stream, thus diminishing the extent of soil erosion. The plastic from which shoe 30 and cover 24 can be molded must be particularly tough, stiff and resilient. I prefer Delren (a trademark of E. I. duPont de Nemours and Company) and Celcon (trademark of Celanese Corp. of America) as fabrication materials for the molded plastic portions of the gate of this invention.

I claim:

1. In a gate valve for controlling the flow of water through an opening in the side wall of aboveground irrigation pipe, said valve having a first element slidably positioned within the pipe, and a second element slidably positioned external to the pipe, said first and second elements including connecting means for attaching these elements to each other so that sliding motion imparted to the second element is also imparted to the first element, said first element including a flexible, resilient member adapted to bear against the inner surface of the pipe wall around the entire opening thereof when the gate is closed, thereby sealing the pipe, the improvement comprising:

said connecting means including a rigid lever arm rigidly fixed to said first element adjacent to the downstream end of the first element and extending through said opening in the pipe to a point substantially outside exterior surface of the pipe, said connecting means including lever-engaging means attached to said second element, said lever-engaging means pivotally engaging the rigid lever arm element at a point exterior to said pipe, said lever-engaging means including resilient means for urging said first element outwardly against the inner surface of said pipe, said rigid lever arm, and said lever-engaging means being the sole connecting means between said first and second element; and in which said flexible resilient member is a boot having an interior cavity, said boot tightly fitting on a shoe, the end of the boot most distant from said connecting means being rounded from side to side exteriorly and in its interior cavity, the radius of side-to-side curvature of the cavity at that end being greater than the radius of curvature of the opposing end of the shoe, said boot including a tapered fin extending laterally from the sides and the rounded end of the boot, said fin extending from said boot at a level between the sides of the shoe and the interior surface of the pipe.

2. The gate in claim 1 in which the end of the boot closest to the connecting means is substantially straight from side to side and includes a bluntly rounded ridge for sealing that end of the valve, said ridge smoothly blending into the pipe-facing surface of the fin to provide a continuous sealing surface.

3. In a gate valve for controlling the flow of water through an opening in the side wall of aboveground irrigation pipe, said valve having a first element slidably positioned within the pipe, and a second element slidably positioned external to the pipe, said first and second elements including connecting means for attaching these elements to each other so that sliding motion imparted to the second element is also imparted to the first element, said first element including a flexible, resilient member adapted to bear against the inner surface of the pipe wall around the entire opening thereof when the gate is closed, thereby sealing the pipe, the improvement comprising:

said connecting means including a rigid lever arm rigidly fixed to said first element adjacent to the downstream end of the first element and extending through said opening in the pipe to a point substantially outside exterior surface of the pipe, said connecting means including lever-engaging means attached to said second element, said lever-engaging means pivotally engaging the rigid lever arm element at a point exterior to said pipe, said lever-engaging means including resilient means for urging said first element outwardly against the inner surface of said pipe, said rigid lever arm, and said lever-engaging means being the sole connecting means between said first and second element; and in which said lever arm comprises two post members spaced apart side by side, said posts being connected by a crossbar at a point substantially beyond the exterior surface of the pipe; said lever-engaging means being a resilient tongue having a transverse groove thereon adapted to pivotally engage said crossbar in said groove when the tongue is resiliently depressed below said crossbar.

4. The gate valve of claim 3 in which said engaging means includes a flat metal spring positioned against the tongue between said tongue and said first element; and means for holding the spring firmly against the tongue in a face-to-face relationship.